United States Patent
Matsunaga et al.

(10) Patent No.: US 9,574,525 B2
(45) Date of Patent: Feb. 21, 2017

(54) APPARATUS FOR SUPPRESSING FUEL EVAPORATIVE GAS EMISSION

(71) Applicant: MITSUBISHI JIDOSHA KOGYO KABUSHIKI KAISHA, Tokyo (JP)

(72) Inventors: Hideo Matsunaga, Okazaki (JP); Katsuhiro Furuta, Okazaki (JP); Hisakazu Ikedaya, Okazaki (JP); Hitoshi Kamura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 310 days.

(21) Appl. No.: 14/139,377

(22) Filed: Dec. 23, 2013

(65) Prior Publication Data

US 2014/0174573 A1 Jun. 26, 2014

(30) Foreign Application Priority Data

Dec. 26, 2012 (JP) ................ 2012-282671

(51) Int. Cl.
*F02M 25/08* (2006.01)
*B60K 15/035* (2006.01)

(52) U.S. Cl.
CPC .... *F02M 25/0809* (2013.01); *B60K 15/03519* (2013.01); *B60K 2015/03514* (2013.01); *B60K 2015/03566* (2013.01); *B60K 2015/03571* (2013.01); *B60K 2015/03585* (2013.01); *B60Y 2200/92* (2013.01); *Y10T 137/86083* (2015.04)

(58) Field of Classification Search
CPC ............ B60K 15/03504; B60K 15/03519; B60K 2015/03514; B60K 2015/03566; B60K 2015/03571; B60K 2015/03585; B60K 2015/0358; F02M 25/0809; F02M 25/0818; F02M 25/0827; Y10T 137/86083
USPC ........... 123/516, 518, 519, 520, 521, 198 D; 137/43, 493, 587, 588, 589; 73/114.39
See application file for complete search history.

(56) References Cited

U.S. PATENT DOCUMENTS

| 5,572,981 A | * | 11/1996 | Pfleger ............... F02M 25/0809 123/520 |
| 5,575,265 A | * | 11/1996 | Kurihara ............ F02M 25/0809 123/520 |
| 6,247,458 B1 | * | 6/2001 | Heinemann ........ F02M 25/0818 123/516 |

(Continued)

FOREIGN PATENT DOCUMENTS

| JP | 10-18835 A | 1/1998 |
| JP | 2004-156494 A | 6/2004 |
| JP | 4151382 B2 | 9/2008 |

*Primary Examiner* — Carlos A Rivera
*Assistant Examiner* — Carl Staubach
(74) *Attorney, Agent, or Firm* — Birch, Stewart, Kolasch & Birch, LLP

(57) ABSTRACT

A purge solenoid valve is opened to introduce an atmospheric pressure into a fuel tank, the purge solenoid valve is closed to operate a negative pressure pump, and set an internal pressure of the tank to a reference pressure Pb. Then, a changeover valve is closed, and the purge solenoid valve is opened to cause a canister to communicate with an intake passage. Further, the changeover valve is opened, and the purge solenoid valve is closed. Then, a first tank internal pressure Po is detected and subtracted from the reference pressure Pb. If a calculated first pressure deviation ΔPo is larger than a first threshold ΔP1, it is determined that there is no open sticking in a sealing valve.

7 Claims, 5 Drawing Sheets

(56) References Cited

U.S. PATENT DOCUMENTS

| | | | | |
|---|---|---|---|---|
| 6,533,002 B1* | 3/2003 | Kobayashi | B60K 15/03504 | 141/198 |
| 7,383,826 B2* | 6/2008 | Kano | F02M 25/08 | 123/518 |
| 8,176,774 B2* | 5/2012 | Meixner | F02M 37/0052 | 73/114.39 |
| 2004/0089062 A1* | 5/2004 | Matsubara | F02M 25/0818 | 73/114.41 |
| 2004/0089063 A1* | 5/2004 | Matsubara | F02M 25/089 | 73/114.41 |
| 2004/0089064 A1* | 5/2004 | Kidokoro | F02M 25/0809 | 73/114.41 |
| 2004/0089275 A1* | 5/2004 | Kidokoro | F02M 25/0836 | 123/520 |
| 2004/0094133 A1* | 5/2004 | Lingenhult | F02M 25/0809 | 123/519 |
| 2004/0173011 A1* | 9/2004 | Nakoji | F02M 25/0809 | 73/114.41 |
| 2004/0250805 A1* | 12/2004 | Osanai | F02D 41/004 | 123/698 |
| 2004/0261765 A1* | 12/2004 | Osanai | F02M 25/0827 | 123/325 |
| 2005/0044938 A1* | 3/2005 | Tsuruta | F02M 25/0818 | 73/114.41 |
| 2005/0257607 A1* | 11/2005 | Suzuki | F02M 25/0818 | 73/114.39 |
| 2005/0257608 A1* | 11/2005 | Suzuki | F02M 25/0827 | 73/114.39 |
| 2005/0257780 A1* | 11/2005 | Suzuki | F02M 25/0809 | 123/519 |
| 2007/0246025 A1* | 10/2007 | Sato | F02D 41/0045 | 123/520 |
| 2008/0092858 A1* | 4/2008 | Satoh | F02M 25/089 | 123/520 |
| 2010/0223984 A1* | 9/2010 | Pursifull | F02M 25/0836 | 73/114.39 |
| 2011/0166765 A1* | 7/2011 | DeBastos | B60K 15/03504 | 701/102 |
| 2011/0197862 A1* | 8/2011 | Der Manuelian | F02M 25/0809 | 123/521 |
| 2011/0253110 A1* | 10/2011 | Fukui | F02D 41/004 | 123/520 |
| 2011/0315127 A1* | 12/2011 | Jackson | F02D 41/0037 | 123/521 |
| 2013/0008414 A1* | 1/2013 | Matsunaga | F02M 25/0836 | 123/519 |
| 2013/0008415 A1* | 1/2013 | Matsunaga | F02M 25/0836 | 123/520 |
| 2014/0174411 A1* | 6/2014 | Matsunaga | F02M 25/0836 | 123/520 |
| 2014/0182360 A1* | 7/2014 | Horiba | G01M 3/2876 | 73/40.5 R |
| 2015/0114361 A1* | 4/2015 | Matsunaga | F02M 25/0818 | 123/520 |
| 2015/0122228 A1* | 5/2015 | Bolger | F02M 25/0836 | 123/518 |

* cited by examiner

APPARATUS FOR SUPPRESSING FUEL EVAPORATIVE GAS EMISSION

BACKGROUND OF THE INVENTION

Field of the Invention

The present invention relates to an apparatus for suppressing fuel evaporative gas emission, and more particularly to control for detecting an abnormality of the apparatus for suppressing fuel evaporative gas emission.

Description of the Related Art

Conventionally, in order to prevent emission of a fuel evaporative gas evaporated in a fuel tank into the atmosphere, an apparatus for suppressing fuel evaporative gas emission is provided including: a canister mounted in a purge passage that provides communication between a fuel tank and an intake passage of an internal combustion engine; a changeover valve that opens or closes the canister to or from the atmosphere; a sealing valve that provides communication or closes between the fuel tank and the canister; and a purge solenoid valve that provides communication of and interrupts the purge passage. The apparatus for suppressing fuel evaporative gas emission opens the changeover valve and the sealing valve and closes the purge solenoid in fueling so that the fuel evaporative gas flows toward the canister, and the fuel evaporative gas is adsorbed to activated carbon provided in the canister. The apparatus for suppressing fuel evaporative gas emission opens the changeover valve and the purge solenoid valve in operation of the internal combustion engine, and discharges the fuel evaporative gas adsorbed to the activated carbon in the canister to the intake passage of the internal combustion engine to treat the fuel evaporative gas. The apparatus for suppressing fuel evaporative gas emission also detects a leak from the apparatus in order to prevent the fuel evaporative gas from leaking outside the apparatus.

For leak detection, in a conventional vehicle that travels with a drive force of an internal combustion engine, opening/closing of a changeover valve, a sealing valve, and a purge solenoid valve is controlled in operation of the internal combustion engine, a negative pressure is generated in a purge passage and a fuel tank by a negative pressure generated in an intake passage of the internal combustion engine, and a leak is determined by whether the negative pressure is held or not to detect presence or absence of a leak.

However, in a vehicle such as a plug-in hybrid vehicle that includes an internal combustion engine and also an electric motor, and travels mainly with a drive force of the electric motor, the internal combustion engine is rarely operated in order to improve fuel efficiency, and if a leak in the apparatus for suppressing fuel evaporative gas emission is to be detected in operation of the internal combustion engine, there are few opportunities for leak detection.

Thus, an apparatus for suppressing fuel evaporative gas emission provided in a vehicle with limited operation of an internal combustion engine includes a negative pressure pump that can reduce a pressure in the apparatus for suppressing fuel evaporative gas emission, and controls operation of the negative pressure pump, and opening/closing of a changeover valve, a sealing valve, and a purge solenoid valve during key-off of the vehicle to detect a leak in the apparatus for suppressing fuel evaporative gas emission.

In such an apparatus for suppressing fuel evaporative gas emission, if failures occur such as open sticking that is sticking of the changeover valve, the sealing valve, and the purge solenoid valve in an opened state, or closed sticking that is sticking thereof in a closed state, a fuel evaporative gas cannot be adsorbed to activated carbon in a canister, or cannot be discharged to an intake passage of the internal combustion engine.

Thus, for example, as failure detection of a sealing valve, there is a technique of closing a closing valve (sealing valve), and detecting open sticking of the sealing valve from presence or absence of a differential pressure between front and rear of the sealing valve when a differential pressure generation condition is satisfied such as a lapse of time, a change in temperature, a change in fuel temperature, or a change in atmospheric pressure (Japanese Patent No. 4151382).

In the apparatus for treating evaporated fuel of an internal combustion engine in Japanese Patent No. 4151382, it is determined that the sealing valve is normally operated to a closed side if the differential pressure between front and rear of the sealing valve exceeds a determination value when a differential pressure generation condition is satisfied such as a lapse of time, a change in temperature, a change in fuel temperature, or a change in atmospheric pressure, and it is determined that the sealing valve sticks to an open side, that is, the sealing valve is in open sticking if the differential pressure between front and rear of the sealing valve does not exceed the determination value.

However, since open sticking of the sealing valve is determined when a differential pressure generation condition is satisfied such as a lapse of time, a change in temperature, a change in fuel temperature, or a change in atmospheric pressure, unpreferably, open sticking of the sealing valve cannot be determined, for example, when the differential pressure generation condition is not satisfied.

SUMMARY OF THE INVENTION

The present invention is achieved to solve such problems, and has an object to provide an apparatus for suppressing fuel evaporative gas emission that can reliably determine sticking of a sealing valve.

To achieve the above described object, the present invention provides an apparatus for suppressing fuel evaporative gas emission comprising: a communication path that provides communication between an intake passage of an internal combustion engine and a fuel tank; a communication path opening/closing portion that opens/closes communication between the communication path and the intake passage; a tank opening/closing portion that opens or closes the fuel tank to or from the communication path; a canister that is provided to communicate between the communication path opening/closing portion and the tank opening/closing portion in the communication path, and adsorbs a fuel evaporative gas in the communication path; a negative pressure generation portion that generates negative pressure in the canister and the fuel tank via a communication hole that provides communication between inside and outside of the canister; a pressure detection portion that detects an internal pressure of the fuel tank; a communication path control portion that performs communication path closing control to close the communication path opening/closing portion and open the tank opening/closing portion; and a sticking determination control portion that causes the negative pressure generation portion to generate negative pressure in the fuel tank and the canister after the communication path closing control by the communication path control portion, further closes the tank opening/closing portion and then releases the negative pressure in the canister, and performs open sticking determination control to determine open sticking of the tank opening/closing portion based on the internal pressure of the fuel tank at the time.

According to the present invention, the communication path control portion performs the communication path closing control to close the communication path opening/closing portion and open the tank opening/closing portion, then the sticking determination control portion operates the negative pressure generation portion to generate a negative pressure in the fuel tank and the canister, further closes the tank opening/closing portion and then releases the negative pressure in the canister, and determines open sticking of the tank opening/closing portion based on the internal pressure of the fuel tank detected by the pressure detection portion at the time.

As such, if there is no or little change in internal pressure of the fuel tank and the internal pressure of the fuel tank is held when the sticking determination control portion causes the negative pressure generation portion to generate a negative pressure in the fuel tank, then causes the tank opening/closing portion to close the fuel tank and then releases the negative pressure in the canister, the sticking determination control portion can determine that the tank opening/closing portion is normally operated to close the fuel tank. Specifically, the sticking determination control portion can determine that the tank opening/closing portion is not in open sticking.

Thus, since open sticking of the tank opening/closing portion can be determined by holding of the negative pressure in the fuel tank, any operation of the negative pressure generation portion ensures determination of open sticking of the tank opening/closing portion.

Open sticking of the tank opening/closing portion is determined based on a detection result of one pressure detection portion.

For example, if open sticking of the tank opening/closing portion is determined based on detection results of a plurality of pressure detection portions, a failure of any of the plurality of pressure detection portions prevents determination of open sticking of the tank opening/closing portion.

Thus, open sticking of the tank opening/closing portion is determined based on a detection result of one pressure detection portion, thereby reducing a possibility that a failure of any of the plurality of pressure detection portions prevents determination of open sticking of the tank opening/closing portion.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Now, an embodiment of the present invention will be described with reference to the drawings.

Figure 1:
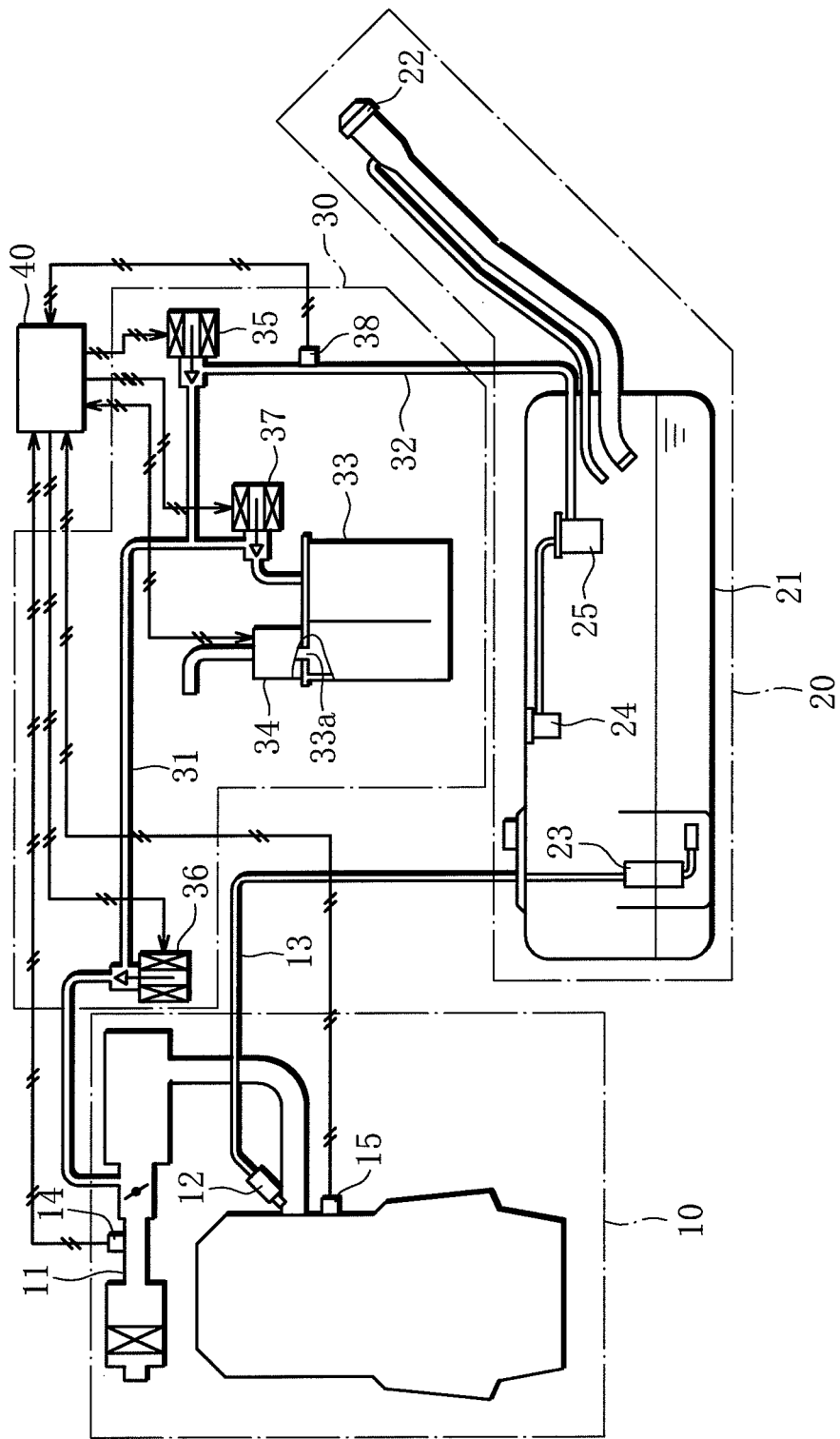
FIG. 1 is a schematic diagram of an apparatus for suppressing fuel evaporative gas emission according to the present invention.
Figure 2:
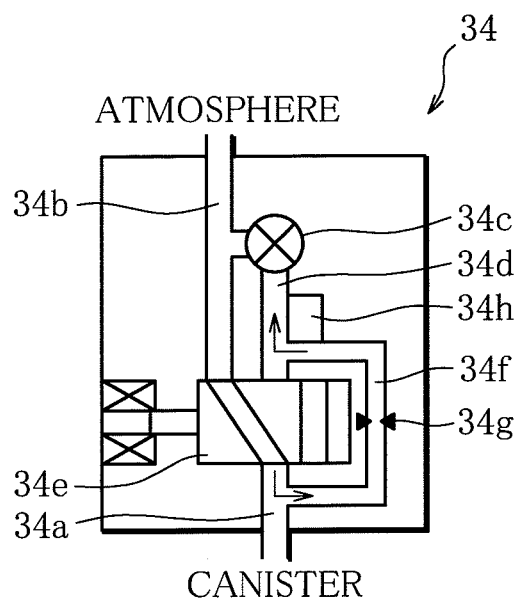
FIG. 2 shows an operation of an internal component when a changeover valve of an evaporative leak check module is not operated.
Figure 3:
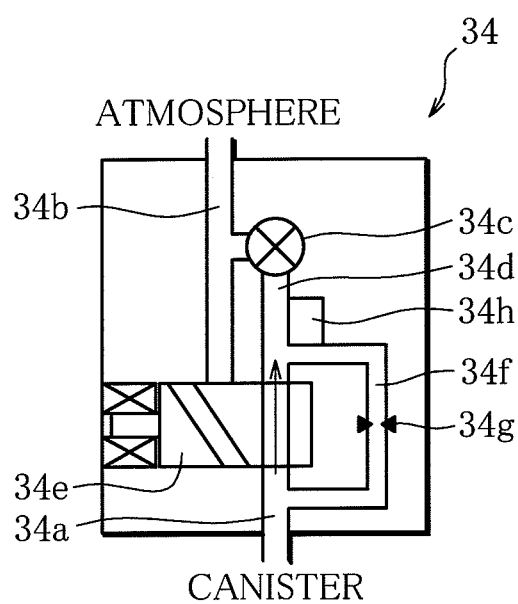
FIG. 3 shows an operation of the internal component when the changeover valve of the evaporative leak check module is operated.

FIG. 1 is a schematic diagram of an apparatus for suppressing fuel evaporative gas emission according to the present invention. FIG. 2 shows an operation of an internal component when a changeover valve of an evaporative leak check module is not operated, and FIG. 3 shows an operation of the internal component when the changeover valve of the evaporative leak check module is operated. Arrows in FIGS. 2 and 3 show a flow direction of air when a negative pressure pump described later is operated in a shown state. The changeover valve is opened when not operated as in FIG. 2, and closed when operated as in FIG. 3. A configuration of the apparatus for suppressing fuel evaporative gas emission will be described below.

The apparatus for suppressing fuel evaporative gas emission according to the present invention is used for a hybrid vehicle that includes a traveling motor and an engine (internal combustion engine) (not shown), and uses any one or both thereof to travel.

As shown in FIG. 1, the apparatus for suppressing fuel evaporative gas emission according to the present invention mainly includes an engine 10 provided in the vehicle, a fuel storage portion 20 that stores fuel, a fuel evaporative gas treatment portion 30 that treats an evaporative gas of the fuel evaporated in the fuel storage portion 20, and an electronic control unit 40 that is a control device for generally controlling the vehicle.

The engine 10 is a four-cycle in-line four-cylinder gasoline engine of an intake passage injection type (Multi Point Injection: MPI). The engine 10 includes an intake passage 11 that takes in air into a combustion chamber in the engine 10. A fuel injection valve 12 that injects fuel into an intake port of the engine 10 is provided downstream of the intake passage 11. A fuel pipe 13 is connected to the fuel injection valve 12, and fuel is supplied from a fuel tank 21 that stores the fuel.

An intake air temperature sensor 14 that detects a temperature of intake air is provided in the intake passage 11 of the engine 10. A water temperature sensor 15 that detects a temperature of cooling water for cooling the engine 10 is provided in the engine 10.

The fuel storage portion 20 includes the fuel tank 21, a fuel fill opening 22 that is a fuel inlet to the fuel tank 21, a fuel pump 23 that supplies the fuel from the fuel tank 21 via the fuel pipe 13 to the fuel injection valve 12, a fuel cutoff valve 24 that prevents the fuel from flowing from the fuel tank 21 to the fuel evaporative gas treatment portion 30, and a leveling valve 25 that controls a fuel level in the fuel tank 21 in fueling. The evaporative gas of the fuel generated in the fuel tank 21 is discharged from the fuel cutoff valve 24 via the leveling valve 25 to the fuel evaporative gas treatment portion 30.

The fuel evaporative gas treatment portion 30 includes a purge pipe (communication path) 31, a vapor pipe (communication path) 32, a canister 33, an evaporative leak check module 34, a sealing valve (tank opening/closing portion) 35, a purge solenoid valve (communication path opening/closing portion) 36, a bypass solenoid valve 37, and a pressure sensor (pressure detection portion) 38.

The purge pipe 31 provides communication between the intake passage 11 of the engine 10 and the canister 33.

The vapor pipe 32 provides communication between the leveling valve 25 of the fuel tank 21 and the purge pipe 31. Specifically, the vapor pipe 32 provides communication between the fuel tank 21 and the purge pipe 31.

The canister 33 includes activated carbon therein. Also, the purge pipe 31 is connected to the canister 33 so that the fuel evaporative gas generated in the fuel tank 21 or the fuel evaporative gas adsorbed to the activated carbon can flow therethrough. The canister 33 also has an atmosphere hole (communication hole) 33a through which outside air is sucked when the fuel evaporative gas adsorbed to the activated carbon is discharged to the intake passage 11 of the engine 10.

As shown in FIGS. 2 and 3, the evaporative leak check module 34 includes a canister-side passage 34a communicating with the atmosphere hole 33a in the canister 33 and an atmosphere-side passage 34b communicating with the atmosphere. The atmosphere-side passage 34b communicates with a pump passage 34d including a negative pressure pump (negative pressure generation portion) 34c. The evaporative leak check module 34 also includes a changeover valve 34e and a bypass passage 34f. The changeover valve 34e includes an electromagnetic solenoid, and is driven by the electromagnetic solenoid. As shown in FIG. 2, the changeover valve 34e provides communication between the canister-side passage 34a and the atmosphere-side passage 34b when the electromagnetic solenoid is not energized (OFF) (corresponding to an open state of the changeover valve 34e). As shown in FIG. 3, the changeover valve 34e provides communication between the canister-side passage 34a and the pump passage 34d when a drive signal is supplied from outside to the electromagnetic solenoid and the electromagnetic solenoid is energized (ON) (corresponding to a closed state of the changeover valve 34e). The bypass passage 34f is a passage that normally provides conduction between the canister-side passage 34a and the pump passage 34d. The bypass passage 34f has a reference orifice 34g of a small diameter (for example, a diameter of 0.45 mm). Between the negative pressure pump 34c in the pump passage 34d and the reference orifice 34g in the bypass passage 34f, a pressure sensor 34h is provided that detects a pressure in the pump passage 34d or the bypass passage 34f downstream of the reference orifice 34g.

The pressure sensor 34h detects a canister internal pressure that is an internal pressure of the canister 33. The pressure sensor 34h can detect internal pressures of the canister 33, the purge pipe 31 from the canister 33 to the purge solenoid valve 36, the vapor pipe 32, and the fuel tank 21 when the changeover valve 34e is closed, the canister-side passage 34a communicates with the pump passage 34d, the purge solenoid valve 36 is closed, and the sealing valve 35 and the bypass solenoid valve 37 are opened.

The sealing valve 35 is mounted in the vapor pipe 32 between the fuel tank 21 and the purge pipe 31. The sealing valve 35 includes an electromagnetic solenoid, and is driven by the electromagnetic solenoid. The sealing valve 35 is a normally closed electromagnetic valve that is closed when the electromagnetic solenoid is not energized (OFF), and opened when a drive signal is supplied from outside to the electromagnetic solenoid and the electromagnetic solenoid is energized (ON). The sealing valve 35 closes the vapor pipe 32 when the electromagnetic solenoid is not energized (OFF) and is closed, and opens the vapor pipe 32 when the drive signal is supplied from outside to the electromagnetic solenoid and the electromagnetic solenoid is energized (ON) and opened. Specifically, the sealing valve 35, when closed, seals the fuel tank 21, and prevents the fuel evaporative gas generated in the fuel tank 21 from flowing to the canister 33 or the intake passage 11 of the engine 10, while, when opened, allows the fuel evaporative gas to flow to the canister 33 or the intake passage 11 of the engine 10.

The purge solenoid valve 36 is mounted in the purge pipe 31 between the intake passage 11 and a connecting portion between the purge pipe 31 and the vapor pipe 32. The purge solenoid valve 36 includes an electromagnetic solenoid, and is driven by the electromagnetic solenoid. The purge solenoid valve 36 is a normally closed electromagnetic valve that is closed when the electromagnetic solenoid is not energized (OFF), and opened when a drive signal is supplied from outside to the electromagnetic solenoid and the electromagnetic solenoid is energized (ON). The purge solenoid valve 36 closes the purge pipe 31 when the electromagnetic solenoid is not energized (OFF) and is closed, and opens the purge pipe 31 when the drive signal is supplied from outside to the electromagnetic solenoid and the electromagnetic solenoid is energized (ON) and opened. Specifically, the purge solenoid valve 36, when closed, prevents the fuel evaporative gas from flowing from the canister 33 or the fuel tank 21 to the intake passage 11 of the engine 10, and, when opened, allows the fuel evaporative gas to flow from the canister 33 or the fuel tank 21 to the intake passage 11 of the engine 10.

The bypass solenoid valve 37 is mounted in the purge pipe 31 between the connecting portion between the purge pipe 31 and the vapor pipe 32 and the canister 33. The bypass solenoid valve 37 includes an electromagnetic solenoid, and is driven by the electromagnetic solenoid. The bypass solenoid valve 37 is a normally open electromagnetic valve that is opened when the electromagnetic solenoid is not energized (OFF), and closed when a drive signal is supplied from outside to the electromagnetic solenoid and the electromagnetic solenoid is energized (ON). The bypass solenoid valve 37 opens the canister 33 to the purge pipe 31 when the electromagnetic solenoid is not energized (OFF) and is opened, and closes the canister 33 when the drive signal is supplied from outside to the electromagnetic solenoid and the electromagnetic solenoid is energized (ON) and closed. Specifically, the bypass solenoid valve 37, when closed, seals the canister 33 and prevents the fuel evaporative gas from flowing to or from the canister 33. The bypass solenoid valve 37, when opened, allows the fuel evaporative gas to flow to or from the canister 33.

The pressure sensor 38 is provided in the vapor pipe 32 between the fuel tank 21 and the sealing valve 35. The pressure sensor 38 detects a tank internal pressure that is an internal pressure of the fuel tank 21. The pressure sensor 38 can detect the internal pressure of only the fuel tank 21 when the sealing valve 35 is closed and the fuel tank 21 is sealed.

The electronic control unit 40 is a control device for generally controlling the vehicle, and includes an input/output device, a storage device (ROM, RAM, non-volatile RAM, or the like), a central processing unit (CPU), a timer, or the like.

To an input side of the electronic control unit 40, the intake air temperature sensor 14, the water temperature sensor 15, the pressure sensor 34h, and the pressure sensor 38 are connected, and detection information from these sensors are input.

On the other hand, to an output side of the electronic control unit 40, the fuel injection valve 12, the fuel pump 23, the negative pressure pump 34c, the changeover valve 34e, the sealing valve 35, the purge solenoid valve 36, and the bypass solenoid valve 37 are connected.

The electronic control unit 40 controls operation of the negative pressure pump 34c, and opening/closing of the changeover valve 34e, the sealing valve 35, the purge solenoid valve 36, and the bypass solenoid valve 37 based on detection information from the various sensors, and performs purge process control for the fuel evaporative gas generated in the fuel tank 21 to be adsorbed to the canister 33, or to discharge the fuel evaporative gas adsorbed to the canister 33 or the fuel evaporative gas generated in the fuel tank 21 to the intake passage 11 of the engine 10 in operation of the engine 10. Also, during stop of the operation of the engine 10, the electronic control unit 40 detects a leak in the fuel storage portion 20 and the fuel evaporative gas treatment portion 30, includes a communication path control portion 42 and a sticking determination control portion 44, and performs sticking detection control to detect presence or absence of open sticking that is sticking of the sealing valve 35 in an opened state or closed sticking that is sticking of the sealing valve 35 in a closed state.

The sticking detection control of the sealing valve 35 by the communication path control portion 42 and the sticking determination control portion 44 in the electronic control unit 40 thus configured according to the present invention will be described. The sticking detection control of the sealing valve 35 is performed during stop of operation of the engine 10. During the sticking detection control of the sealing valve 35, the bypass solenoid valve 37 is normally not energized (OFF). Specifically, during the sticking detection control of the sealing valve 35, the bypass solenoid valve 37 is normally opened.

Figure 4:
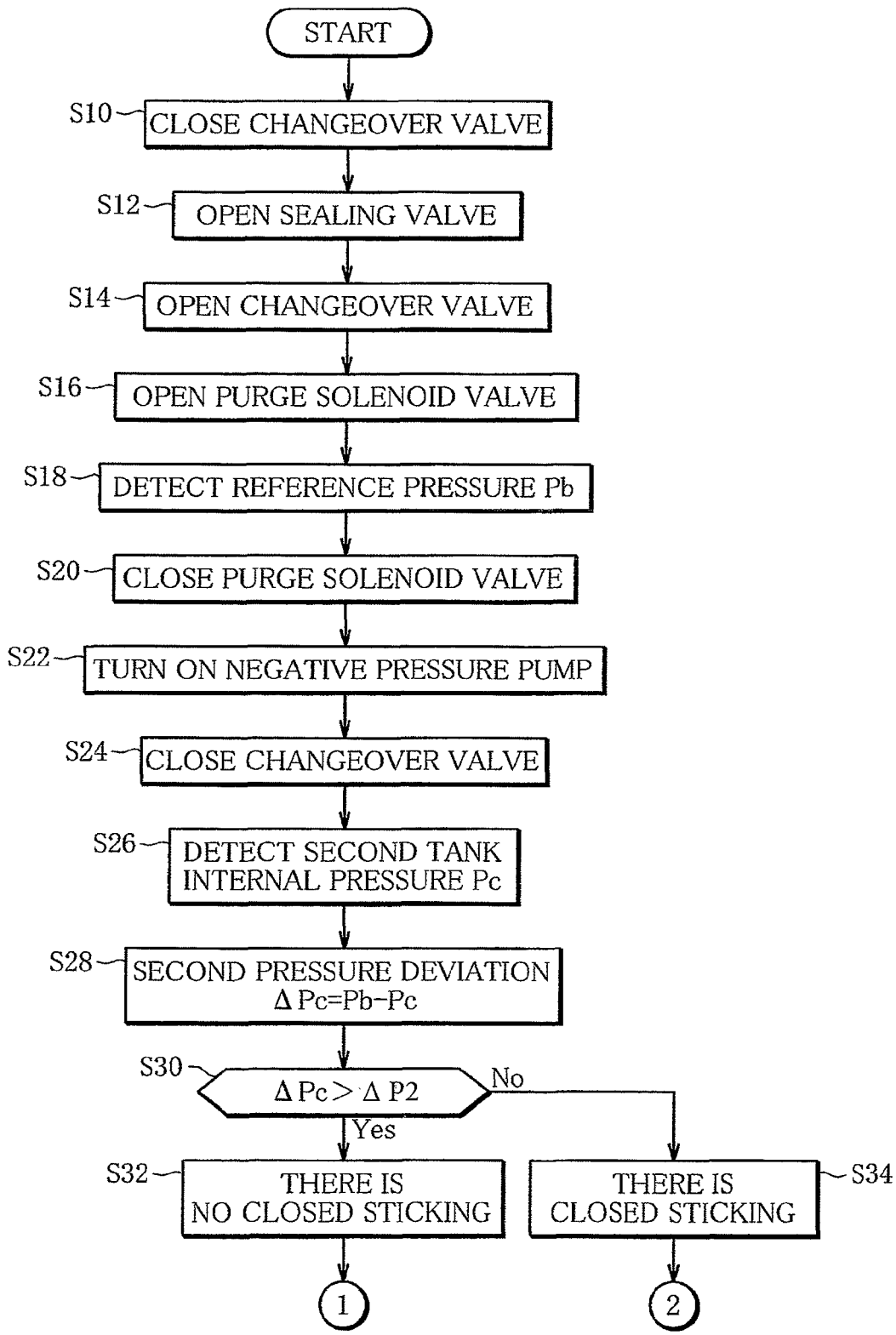
FIG. 4 is a part of a control flowchart of sticking detection control of a sealing valve performed by an electronic control unit according to the present invention.
Figure 5:
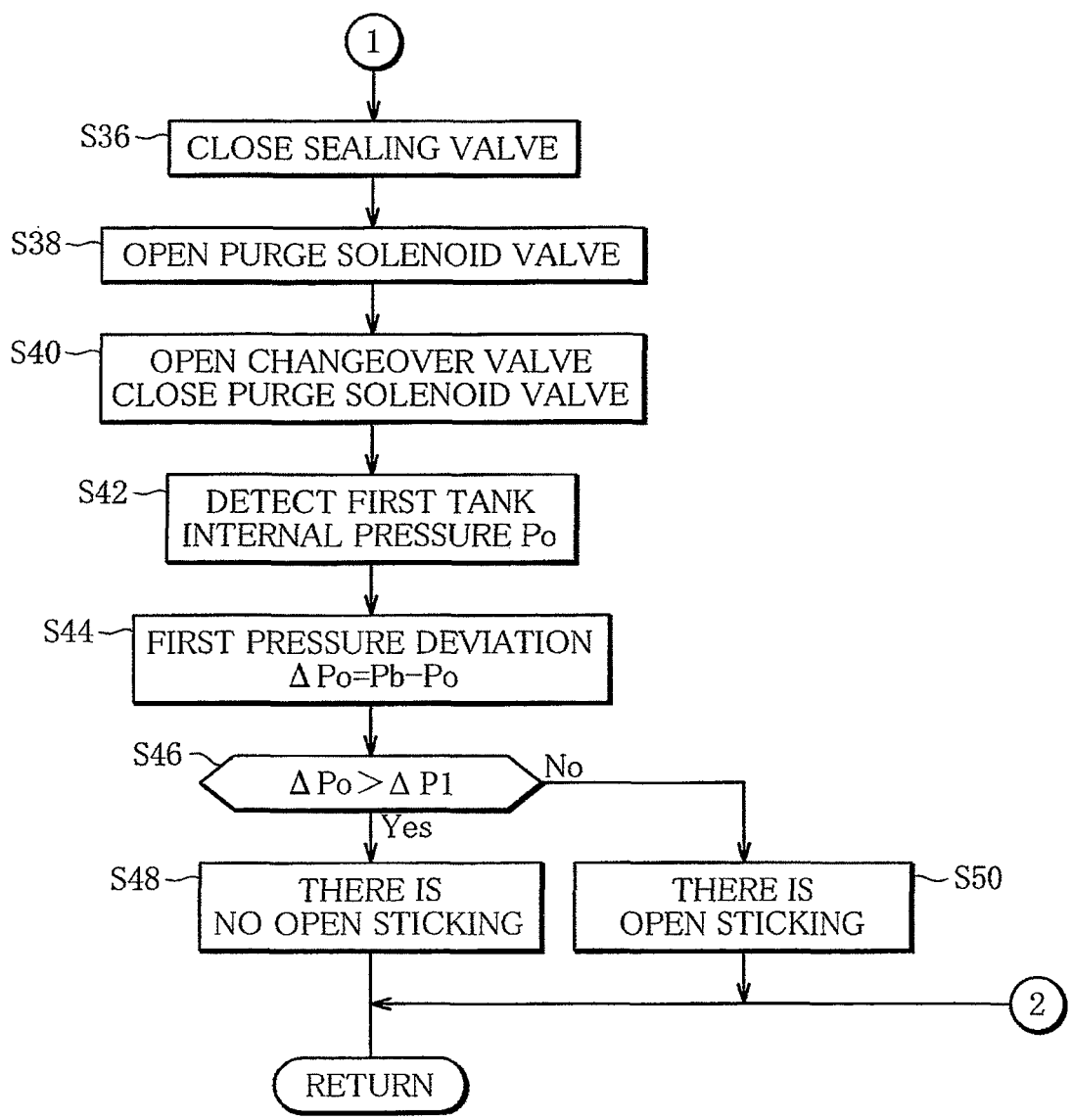
FIG. 5 is the rest of the control flowchart of the sticking detection control of the sealing valve performed by the electronic control unit according to the present invention.
Figure 6:
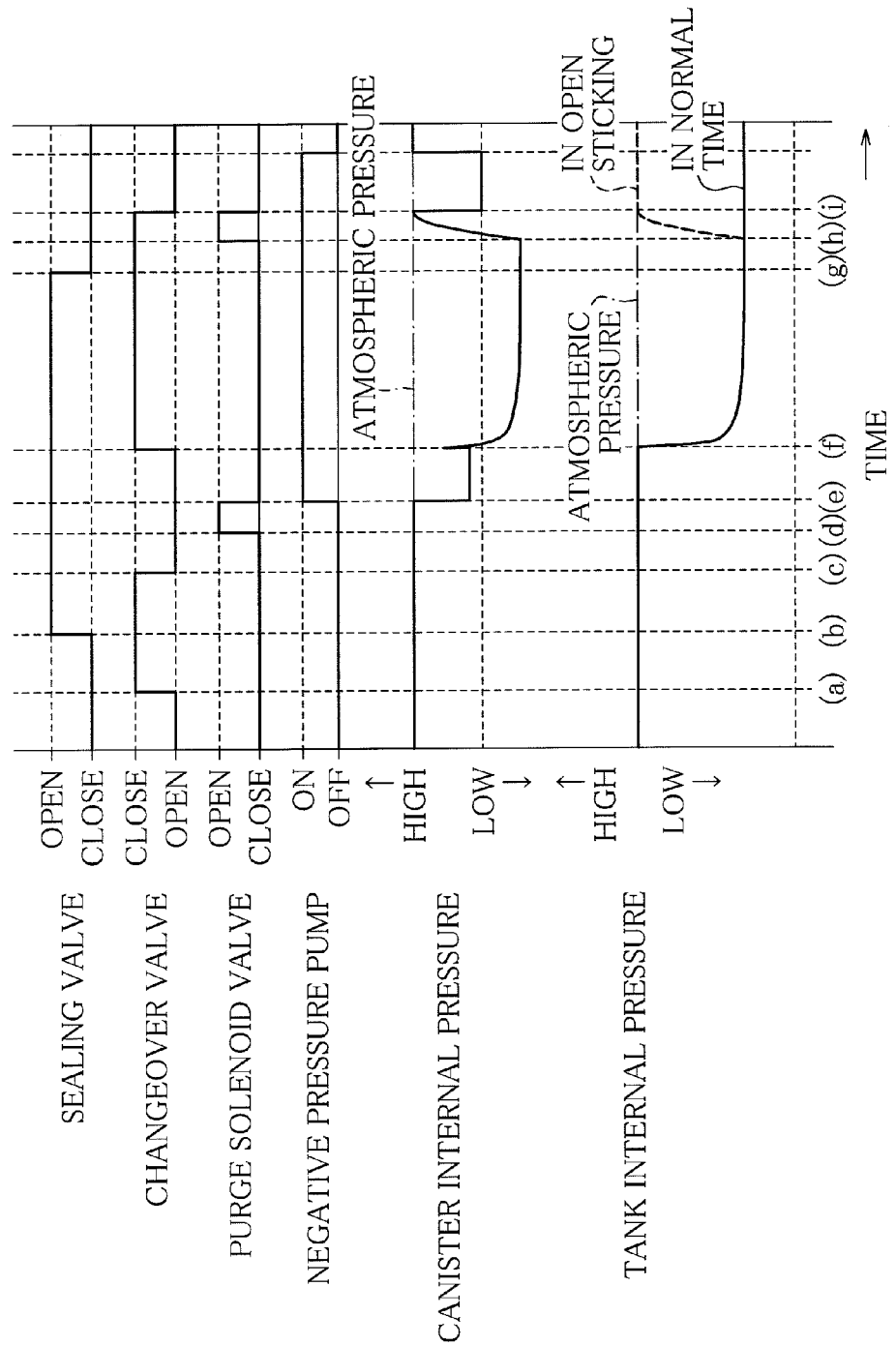
FIG. 6 chronologically shows an example of operations of the sealing valve, the changeover valve, a purge solenoid valve, and a negative pressure pump in the sticking detection control of the sealing valve, and transition of a canister pressure and a tank internal pressure.

FIG. 4 is a part of a control flowchart of the sticking detection control of the sealing valve performed by the electronic control unit 40. FIG. 5 is the rest of the control flowchart of the sticking detection control of the sealing valve performed by the electronic control unit 40. FIG. 6 chronologically shows an example of operations of the sealing valve 35, the changeover valve 34e, the purge solenoid valve 36, and the negative pressure pump 34c in the sticking detection control of the sealing valve, and transition of a canister pressure and a tank internal pressure. The thick broken line in FIG. 6 shows a change in tank internal pressure when the sealing valve 35 is in open sticking. The dash-single-dot line in FIG. 6 shows atmospheric pressure.

As shown in FIGS. 4, 5 and 6, in Step S10, a drive signal is supplied from outside to an electromagnetic solenoid of the changeover valve 34e to energize the electromagnetic solenoid (ON), thereby closing the changeover valve 34e (FIG. 6(a)). Then, the process proceeds to Step S12.

In Step S12, a drive signal is supplied from outside to an electromagnetic solenoid of the sealing valve 35 to energize the electromagnetic solenoid (ON), thereby opening the sealing valve 35 (FIG. 6(b)). Then, the process proceeds to Step S14. When the purge solenoid valve 36 is opened, in this step, supply of a drive signal from outside to an electromagnetic solenoid of the purge solenoid valve 36 is finished to de-energize the electromagnetic solenoid (OFF), thereby closing the purge solenoid valve 36. (The process in this step corresponds to communication path closing control by the communication path control portion 42 in the present invention.)

In Step S14, the supply of the drive signal to the electromagnetic solenoid of the changeover valve 34e is stopped to de-energized the electromagnetic solenoid (OFF), thereby opening the changeover valve 34e (FIG. 6(c)). Then, the process proceeds to Step S16.

In Step S16, a drive signal is supplied from outside to the electromagnetic solenoid of the purge solenoid valve 36 to energize the electromagnetic solenoid (ON), thereby opening the purge solenoid valve 36, causing the fuel tank 21, the purge pipe 31, the vapor pipe 32, and the canister 33 to communicate with the intake passage 11 of the engine 10, and causing an internal pressure of each thereof to be atmospheric pressure (FIG. 6(d)). Then, the process proceeds to Step S18.

In Step S18, a reference pressure Pb is detected. More specifically, the pressure sensor 38 detects a tank internal pressure that is an internal pressure of the fuel tank 21, and sets the tank internal pressure as the reference pressure Pb. In Step 16, the purge solenoid valve 36 is opened, and the tank internal pressure is an atmospheric pressure, and thus the reference pressure Pb herein is the atmospheric pressure. Then, the process proceeds to Step S20.

In Step S20, the supply of the drive signal to the electromagnetic solenoid of the purge solenoid valve 36 is stopped to de-energized the electromagnetic solenoid (OFF), thereby closing the purge solenoid valve 36 (FIG. 6(e)). Then, the process proceeds to Step S22.

In Step S22, the negative pressure pump 34c is operated (FIG. 6(e)). At this time, the changeover valve 34e is opened, thus air is sucked from an atmosphere side by the negative pressure pump 34c, and the pressure sensor 34h detects a pressure of air having passed through the orifice 34g. Specifically, the pressure sensor 34h detects a negative pressure generated in the orifice 34g. Thus, herein, a canister internal pressure in FIG. 6 does not refer to the internal pressure of the canister 33, but refers to the negative pressure generated in the orifice 34g. At this time, the pressure sensor 38 may detect the reference pressure Pb. Then, the process proceeds to Step S24.

In Step S24, a drive signal is supplied from outside to the electromagnetic solenoid of the changeover valve 34e to energized the electromagnetic solenoid (ON), thereby closing the changeover valve 34e (FIG. 6(f)). Then, the process proceeds to Step S26.

In Step S26, a second tank internal pressure (corresponding to an internal pressure of the fuel tank after a negative pressure is generated in the fuel tank and the canister by the negative pressure generation portion in open sticking determination control in the present invention) Pc is detected. More specifically, the pressure sensor 38 detects the second tank internal pressure Pc that is an internal pressure of the fuel tank 21. Then, the process proceeds to Step S28.

In Step S28, a second pressure deviation $\Delta Pc$ is calculated. More specifically, the second tank internal pressure Pc detected in Step S26 is subtracted from the reference pressure Pb to calculate the second pressure deviation $\Delta Pc$. Then, the process proceeds to Step S30.

In Step S30, it is determined whether the second pressure deviation $\Delta Pc$ is larger than a second threshold $\Delta P2$ or not. When the determination result is true (Yes) and the second pressure deviation $\Delta Pc$ is larger than the second threshold $\Delta P2$, the process proceeds to Step S32, it is determined that there is no closed sticking in the sealing valve 35, and the process proceeds to Step S36. When the determination result is false (No) and the second pressure deviation ΔPc is the second threshold ΔP2 or smaller, the process proceeds to Step S34, it is determined that there is closed sticking in the sealing valve 35, and this routine is returned.

In Step S36, the supply of the drive signal from outside to the electromagnetic solenoid of the sealing valve 35 is stopped to de-energized the electromagnetic solenoid (OFF), thereby closing the sealing valve 35 (FIG. 6(g)). Then, the process proceeds to Step S38.

In Step S38, a drive signal is supplied from outside to the electromagnetic solenoid of the purge solenoid valve 36 to energize the electromagnetic solenoid (ON), thereby opening the purge solenoid valve 36, and causing the purge pipe 31 and the canister 33 to communicate with the intake passage 11 of the engine 10 (FIG. 6(h)). Then, the process proceeds to Step S40. (The processes in Steps S22, S36 and S38 correspond to open sticking determination control by the sticking determination control portion 44 in the present invention.)

In Step S40, the supply of the drive signal from outside to the electromagnetic solenoid of the changeover valve 34e is finished to de-energize the electromagnetic solenoid (OFF), thereby opening the changeover valve 34e. Also, the supply of the drive signal to the electromagnetic solenoid of the purge solenoid valve 36 is stopped to de-energize the electromagnetic solenoid (OFF), thereby closing the purge solenoid valve 36 (FIG. 6(i)). Instead of Steps S38 and S40, the negative pressure pump 34c may be made inoperative, and then the changeover valve 34e may be opened. Then, the process proceeds to Step S42.

In Step S42, a first tank internal pressure (corresponding to an internal pressure of the fuel tank detected by the pressure detection portion after open sticking determination control in the present invention) Po is detected. More specifically, the pressure sensor 38 detects the first tank internal pressure Po that is an internal pressure of the fuel tank 21. Then, the process proceeds to Step S44.

In Step S44, a first pressure deviation ΔPo is calculated. More specifically, the first tank internal pressure Po detected in Step S42 is subtracted from the reference pressure Pb to calculate the first pressure deviation ΔPo. Then, the process proceeds to Step S46.

In Step S46, it is determined whether the first pressure deviation ΔPo is larger than a first threshold ΔP1 or not. When the determination result is true (Yes) and the first pressure deviation ΔPo is larger than the first threshold ΔP1, the process proceeds to Step S48, it is determined that there is no closed sticking and open sticking in the sealing valve 35, and this routine is returned. When the determination result is false (No) and the first pressure deviation ΔPo is the first threshold ΔP1 or smaller, the process proceeds to Step S50, it is determined that there is open sticking in the sealing valve 35, and this routine is returned.

As such, in the apparatus for suppressing fuel evaporative gas emission according to the present invention, as shown in FIG. 6, the purge solenoid valve 36 is first opened, the fuel tank 21, the purge pipe 31, the vapor pipe 32, and the canister 33 are caused to communicate with the intake passage 11 of the engine 10, and an internal pressure of each thereof is set to the atmospheric pressure (FIG. 6(d)). Then, the tank internal pressure detected by the pressure sensor 38 is set as the reference pressure Pb. Then, the purge solenoid valve 36 is closed, and further the negative pressure pump 34c is operated (FIG. 6(e)). Then, the changeover valve 34e is closed (FIG. 6(f)). Then, the pressure sensor 38 detects the second tank internal pressure Pc. The second tank internal pressure Pc is subtracted from the reference pressure Pb to calculate the second pressure deviation ΔPc. When the second pressure deviation ΔPc is larger than the second threshold ΔP2, it is determined that there is no closed sticking in the sealing valve 35. When the second pressure deviation ΔPc is the second threshold ΔP2 or smaller, it is determined that there is closed sticking in the sealing valve 35. Then, the sealing valve 35 is closed (FIG. 6(g)). The purge solenoid valve 36 is opened to cause the purge pipe 31 and the canister 33 to communicate with the intake passage 11 of the engine 10 (FIG. 6(h)). Then, the changeover valve 34e is opened, and the purge solenoid valve 36 is closed (FIG. 6(i)). Then, the pressure sensor 38 detects the first tank internal pressure Po. Then the first tank internal pressure Po is subtracted from the reference pressure Pb to calculate the first pressure deviation ΔPo. When the first pressure deviation ΔPo is larger than the first threshold ΔP1, it is determined that there is no closed sticking and open sticking in the sealing valve 35. When the first pressure deviation ΔPo is the first threshold ΔP1 or smaller, it is determined that there is open sticking in the sealing valve 35.

As such, the sealing valve 35 is opened, the purge solenoid valve 36 is closed if opened, further the purge solenoid valve 36 is again opened and then closed, the internal pressure of the fuel tank 21 that is the atmospheric pressure before operation of the negative pressure pump 34c is stored as the reference pressure Pb, the first tank internal pressure Po that is the internal pressure of the fuel tank 21 after the sealing valve 35 is closed and the purge solenoid valve 36 is opened is subtracted from the reference pressure Pb to calculate the first pressure deviation ΔPo, and when the first pressure deviation ΔPo is the first threshold ΔP1 or smaller, it is determined that the sealing valve 35 is in open sticking.

Thus, since open sticking of the sealing valve 35 can be determined by holding of the negative pressure in the fuel tank 21, any operation of the negative pressure pump 34c ensures determination of open sticking of the sealing valve 35.

The purge solenoid valve 36 is opened to cause the purge pipe 31 to communicate with the intake passage 11, thereby releasing the negative pressure in the canister 33. Thus, the negative pressure in the canister 33 can be early released, and open sticking of the sealing valve 35 can be early determined.

In a case where, for example, an outside air temperature is high if the internal pressure of the fuel tank 21 with the sealing valve 35 being closed is the reference pressure Pb after operation of the negative pressure pump 34c, it is likely that fuel in the fuel tank 21 evaporates after setting of the reference pressure Pb, and the internal pressure of the fuel tank 21 increases (negative pressure decreases) between setting of the reference pressure Pb and opening of the purge solenoid valve 36. Thus, even if the sealing valve 35 is normally operated and is closed from opened, it is likely that the evaporation of the fuel in the fuel tank 21 increases the internal pressure of the fuel tank 21, thus a deviation between the internal pressure of the fuel tank 21 and the reference pressure Pb exceeds a predetermined value, and it is erroneously determined that the sealing valve 35 is in open sticking.

Thus, the purge solenoid valve 36 is opened, the internal pressure of the fuel tank 21 that is the atmospheric pressure is set as the reference pressure Pb, the tank first internal pressure Po that is the internal pressure of the fuel tank 21 after the sealing valve 35 is closed and the purge solenoid valve 36 is opened is subtracted from the reference pressure Pb to calculate the first pressure deviation ΔPo, and when the first pressure deviation $\Delta Po$ is the first threshold $\Delta P1$ or smaller, it is determined that the sealing valve 35 is in open sticking, thereby allowing accurate determination of open sticking of the sealing valve 35.

For determination of open sticking and closed sticking of the sealing valve 35, the sealing valve 35 is opened, the purge solenoid valve 36 is closed if opened, and further the purge solenoid valve 36 is again opened and then closed. The fuel tank 21 is caused to temporarily communicate with the intake passage 11 of the engine 10 to ensure that the internal pressure of the fuel tank 21 is the atmospheric pressure, and the reference pressure Pb is the atmospheric pressure, thereby allowing accurate determination of open sticking and closed sticking of the sealing valve 35.

Open sticking and closed sticking of the sealing valve 35 are determined based on the detection result of only the pressure sensor 38.

For example, when open sticking and closed sticking of the sealing valve 35 are determined based on detection results of a plurality of pressure sensors, a failure of any of the plurality of pressure sensors prevents determination of open sticking and closed sticking of the sealing valve 35.

Thus, open sticking and closed sticking of the sealing valve 35 are determined based on the detection result of only the pressure sensor 38, thereby reducing a possibility that a failure of any of the plurality of pressure sensors prevents determination of open sticking and closed sticking of the sealing valve 35.

Also, the sealing valve 35 is opened, the purge solenoid valve 36 is closed if opened, the internal pressure of the fuel tank 21 before operation of the negative pressure pump 34c is stored as the reference pressure Pb, the second tank internal pressure Pc that is the internal pressure of the fuel tank 21 after the changeover valve 34e is closed is subtracted from the reference pressure Pb to calculate the second pressure deviation $\Delta Pc$, and when the second pressure deviation $\Delta Pc$ is the second threshold $\Delta P2$ or smaller, it is determined that the sealing valve 35 is in closed sticking.

As such, if there is no or little change in the second tank internal pressure Pc from the reference pressure Pb and the second tank internal pressure Pc is held at the reference pressure Pb when the negative pressure pump 34c is used to generate a negative pressure in the fuel tank 21, it can be determined that the sealing valve 35 is not normally opened but closes the fuel tank 21. Specifically, it can be determined that the sealing valve 35 is in closed sticking.

Thus, closed sticking of the sealing valve 35 is determined in application of the negative pressure in the fuel tank 21 for determining open sticking of the sealing valve 35, thereby allowing accurate and efficient detection of a failure of the sealing valve 35.

The description on the embodiment of the present invention is now finished, but the embodiment of the present invention is not limited to the above described embodiment.

In the above described embodiment, the sealing valve 35 is opened, the purge solenoid valve 36 is closed if opened, and further the purge solenoid valve 36 is again opened and then closed, thereby setting the internal pressure of the fuel tank 21 to the atmospheric pressure, but not limited to this. The sealing valve 35 may be opened, the purge solenoid valve 36 may be closed if opened, and then the changeover valve 34e may be opened, thereby setting the internal pressure of the fuel tank 21 to the atmospheric pressure.

Also, in the above described embodiment, when the first pressure deviation $\Delta Po$ or the second pressure deviation $\Delta Pc$ between the reference pressure Pb and the first tank internal pressure Po or the second tank internal pressure Pc is the first threshold $\Delta P1$ or smaller or the second threshold $\Delta P2$ or smaller, it is determined that the sealing valve 35 is in open sticking or closed sticking, but not limited to this. For example, it may be determined that the sealing valve 35 is in open sticking or closed sticking when the first tank internal pressure Po or the second tank internal pressure Pc is a determination value or higher without using the reference pressure Pb.

In the above described embodiment, the vehicle is the hybrid vehicle, but not limited to this, the apparatus for suppressing fuel evaporative gas emission including the negative pressure pump that can generate a negative pressure in the fuel tank 21 can detect open sticking and closed sticking of the sealing valve 35, and it goes without saying that there is no problem if the apparatus for suppressing fuel evaporative gas emission is applied to a vehicle that travels only using an engine.

What is claimed is:

1. An apparatus for suppressing fuel evaporative gas emission comprising:
    a communication path that provides communication between an intake passage of an internal combustion engine and a fuel tank;
    a communication path opening/closing portion that opens/closes communication between the communication path and the intake passage;
    a tank opening/closing portion that opens or closes the fuel tank to or from the communication path;
    a canister that is provided to communicate between the communication path opening/closing portion and the tank opening/closing portion in the communication path, and adsorbs a fuel evaporative gas in the communication path;
    a negative pressure generation portion that generates a negative pressure in the canister and the fuel tank via a communication hole that provides communication between inside and outside of the canister;
    a pressure detection portion that detects an internal pressure of the fuel tank;
    a communication path control portion that performs communication path closing control to close the communication path opening/closing portion and open the tank opening/closing portion; and
    a sticking determination control portion that causes the negative pressure generation portion to generate a negative pressure in the fuel tank and the canister after the communication path closing control by the communication path control portion, further closes the tank opening/closing portion by keeping the communication path opening/closing portion closed and then releases the negative pressure in the canister, and performs open sticking determination control to determine open sticking of the tank opening/closing portion based on holding state of the negative pressure in the fuel tank at the time.

2. The apparatus for suppressing fuel evaporation gas emission according to claim 1, wherein
    the sticking determination control portion opens the communication path opening/closing portion to provide communication between the communication path and the intake passage, thereby releasing the negative pressure in the canister.

3. The apparatus for suppressing fuel evaporation gas emission according to claim 1, wherein
    the sticking determination control portion determines closed sticking of the tank opening/closing portion based on a detection result of the pressure detection portion after the negative pressure generation portion generates a negative pressure in the fuel tank and the canister in the open sticking determination control.

4. The apparatus for suppressing fuel evaporation gas emission according to claim 1, wherein the sticking determination control portion stores the internal pressure of the fuel tank detected by the pressure detection portion as a reference pressure after the communication path closing control by the communication path control portion and before generation of the negative pressure in the fuel tank in the open sticking determination control, and determines that there is open sticking in the tank opening/closing portion when a first pressure deviation calculated from the reference pressure and the internal pressure of the fuel tank detected by the pressure detection portion after the open sticking determination control is a first threshold or smaller.

5. The apparatus for suppressing fuel evaporation gas emission according to claim 3, wherein the sticking determination control portion stores the internal pressure of the fuel tank detected by the pressure detection portion as a reference pressure after the communication path closing control by the communication path control portion and before generation of the negative pressure in the fuel tank in the open sticking determination control, and determines that there is closed sticking in the tank opening/closing portion when a second pressure deviation calculated from the reference pressure and the internal pressure of the fuel tank after the negative pressure generation portion generates a negative pressure in the fuel tank and the canister in the open sticking determination control is a second threshold or smaller.

6. The apparatus for suppressing fuel evaporation gas emission according to claim 4, wherein the sticking determination control portion stores the internal pressure of the fuel tank detected by the pressure detection portion as a reference pressure after the communication path closing control by the communication path control portion and before generation of the negative pressure in the fuel tank in the open sticking determination control, and determines that there is closed sticking in the tank opening/closing portion when a second pressure deviation calculated from the reference pressure and the internal pressure of the fuel tank after the negative pressure generation portion generates a negative pressure in the fuel tank and the canister in the open sticking determination control is a second threshold or smaller.

7. The apparatus for suppressing fuel evaporation gas emission according to claim 1, wherein the communication path control portion closes the communication path opening/closing portion and opens the tank opening/closing portion, then again opens and then closes the communication path opening/closing portion in the communication path closing control.

* * * * *